(12) United States Patent
Guager

(10) Patent No.: US 8,382,298 B2
(45) Date of Patent: Feb. 26, 2013

(54) CAMERA LENS CAP

(76) Inventor: Derek Guager, San Diego, CA (US)

(*) Notice: Subject to any disclaimer, the term of this patent is extended or adjusted under 35 U.S.C. 154(b) by 775 days.

(21) Appl. No.: 11/866,454

(22) Filed: Oct. 3, 2007

(65) Prior Publication Data

US 2009/0091827 A1 Apr. 9, 2009

(51) Int. Cl.
*G02B 11/04* (2006.01)
(52) U.S. Cl. .................................................. 359/511
(58) Field of Classification Search ............... 359/511
See application file for complete search history.

(56) References Cited

U.S. PATENT DOCUMENTS

| | | | |
|---|---|---|---|
| 6,033,130 A | 3/2000 | Muroi et al. | |
| 6,132,110 A | 10/2000 | Kume et al. | |
| 6,672,777 B2 | 1/2004 | Kobayashi et al. | |

FOREIGN PATENT DOCUMENTS

| | | |
|---|---|---|
| JP | 602277236 | 11/1985 |
| JP | 04128729 | 4/1992 |
| JP | 200384332 | 3/2003 |
| JP | 2005114874 | 4/2005 |

OTHER PUBLICATIONS

International Search Report dated Feb. 26, 2009.*
Written Opinion of the International Searching Authority dated Feb. 26, 2009.*

* cited by examiner

*Primary Examiner* — Jennifer L. Doak
(74) *Attorney, Agent, or Firm* — Young, Basile, Hanlon & MacFarlane P.C.

(57) ABSTRACT

A camera lens cap includes radially movable latch members carried on an endwall of the cap and apparatus having exposed user engageable surfaces. The latch members are movable between the first latching position and a second unlatched position relative to an adapter which has a camera lens attachment feature. An interior groove formed in the adapter and engageable by the latch members when the latch members are disposed in the first latching position to affix the lens cap on the adapter and the camera lens.

14 Claims, 7 Drawing Sheets

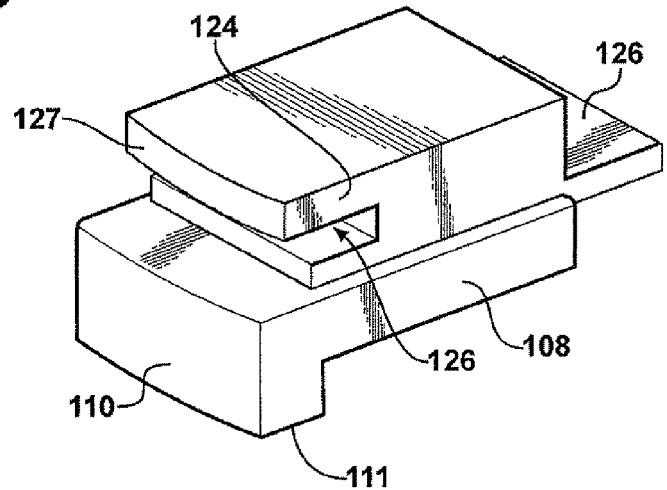
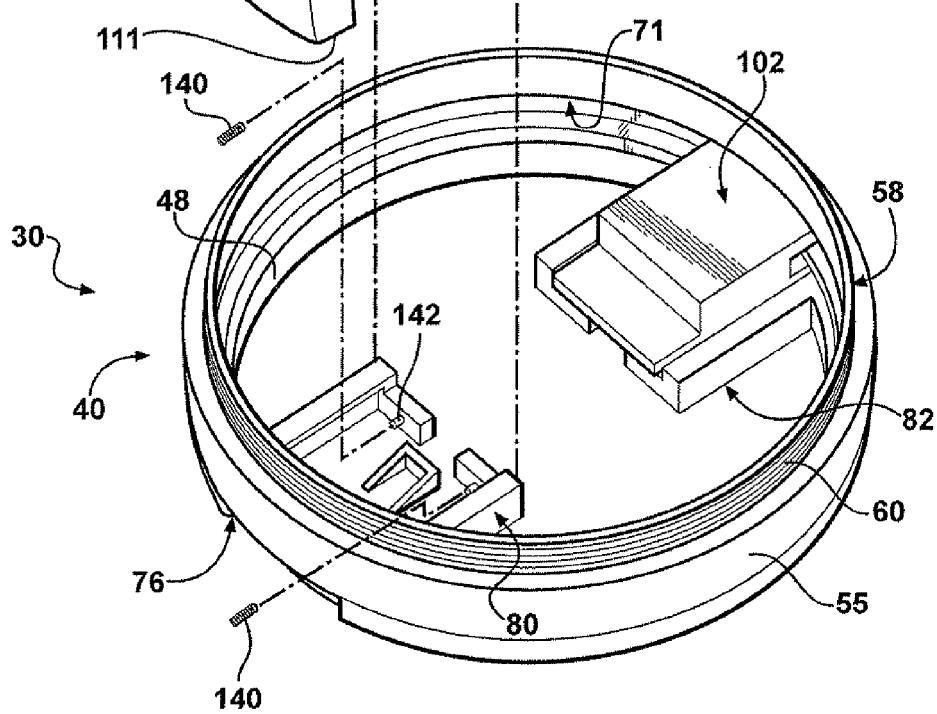

CAMERA LENS CAP

BACKGROUND

Cameras and video cameras use a lens to focus an image. Such lenses typically have an internally threaded outer end for receiving adapter rings or other lens attachments, such as filters, etc.

Lens caps have long been used to cover the open end of the lens, filters, etc. to prevent dust or scratching of the lens or filter surface. Such lens caps have an opaque end wall with two slidable, diametrically opposed, latches on the side edges of the end wall. The latches are spring biased toward a radially outward direction.

In use, the two latches are urged inward by finger pressure until an edge of each latch clears an inner diameter of the lens, filter, adapter ring, etc. to enable the lens cap to be removed from the lens, etc.

When attaching the lens cap, the cap is urged towards the lens or filter until the latch fingers grip and engage the adapter ring or lens. Either finger pressure or snap-in pressure works against the latch springs to move the springs radially inward until the latch edges pass into engagement with the typically single thread on the inner diameter of the adapter ring or lens to mount the lens cap on the lens, filter, etc. by spring force.

The easy attachment and removal of the lens cap from a lens or filter also contributes to a major problem, namely, easy, unintended engagement of the lens cap from the camera lens, such as when placing the camera in a bag, pocket, purse, or inadvertently striking the camera by another object.

What is needed is a camera lens cap which, while is still easily attachable to and removable from a camera lens, filter, adapter ring, etc. provides a secure locking force to minimize unintentional disengagement of a lens cap from the camera lens.

SUMMARY

A camera lens cap apparatus includes an adapter ring having first and second ends, the second end of the adapter ring assembly engageable with the attachment ends of a camera lens. An annular recess or groove is carried intermediate the first and second ends of the adapter ring.

A lens cap has endwalls. A pair of latch members are movably carried on the endwall for movement between a first, radially outward, latching position and a second, radially inward, unlatching position. Each latch member has a user engageable surface and a spaced latch finger removably engageable with the groove in the adapter ring assembly to mount the lens cap to the adapter ring assembly.

Latch mounting structures are carried on the end cap for removably receiving the latch members. The latch members may be slidably mounted in each latch mounting structure.

Biasing members are mounted between each latch member and each latch mounting structure for normally biasing each latch member to the first latching position relative to the endwall.

Opposed apertures are formed in the lens cap. The first user engageable surface of each latch member is slidably disposed through one of the apertures.

The adapter ring includes a first adapter ring portion having an inner surface and an outer surface, the inner surface terminating in an annular shoulder and a second adapter ring portion having an outer surface with a camera attachment feature and an inner surface including a shoulder. The first adapter ring portion is fixedly mounted in the second adapter ring portion with the shoulders spaced from each other to form the annular groove.

The disclosed camera lens cap apparatus maintains the easy attachability and removability required for a camera lens cap while providing enhanced engagement of the lens cap on the camera lens to minimize the possibility of inadvertent disengagement when the lens cap is struck by an external force or object.

BRIEF DESCRIPTION OF THE DRAWING

The various features, advantages, and other uses of the present invention will become more apparent by referring to the following detailed description and drawing in which:

FIG. 10 is a right end, bottom, perspective view of the latch member shown in FIG. 8;

FIG. 11 is an exploded perspective showing the mounting of one latch member on a latch receiver carried on the lens cap;

DETAILED DESCRIPTION

Figure 1:
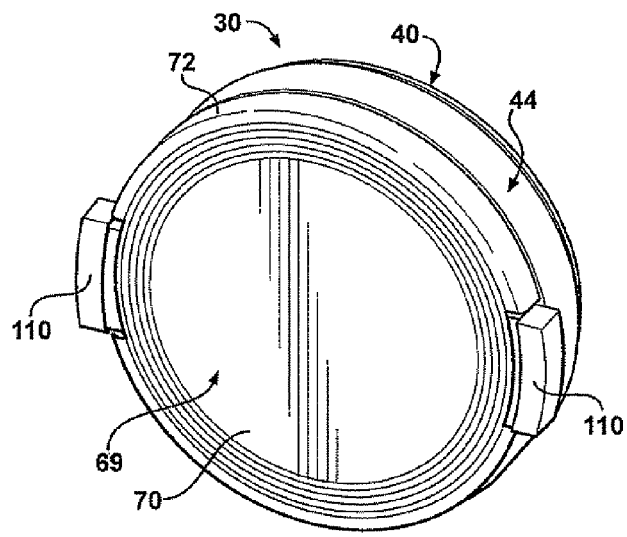
FIG. 1 is a perspective assembled view of a camera lens cap apparatus.
Figure 2:
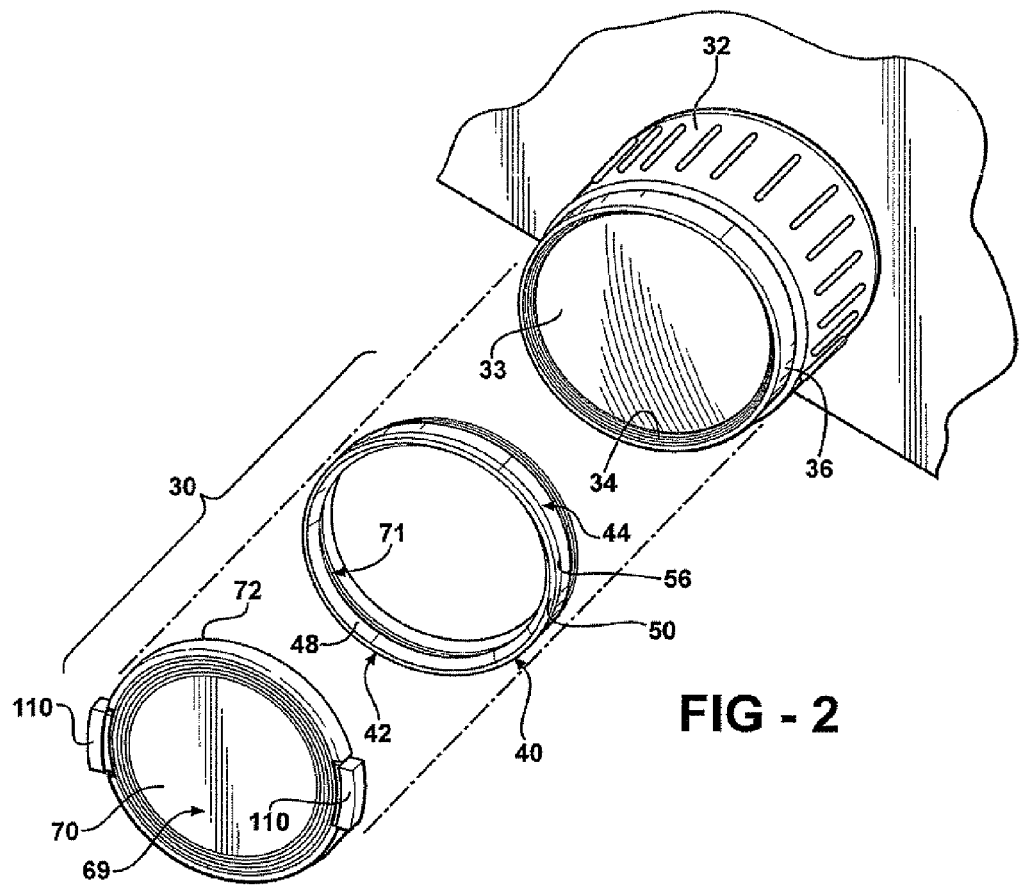
FIG. 2 is an exploded, front perspective view of the lens cap apparatus shown in FIG. 1 mountable on a camera lens.

Referring to FIGS. 1-15 of the drawing, and to FIGS. 1 and 2 in particular, there is depicted a lens cap apparatus 30 which is removably attachable to a camera lens 32 to cover the optical surface 33 of the lens 32.

It will be understood that although the lens cap 30 is described hereafter as being mountable on a camera lens 32, the lens cap apparatus 30 may also be mounted on a camera lens filter, accessory adapter ring, etc., which is typically engageable with internal threads 34 formed on the inner diameter of an outer end 36 of the camera lens 32. Therefore, the term "lens" will be meant to include any component mountable on a camera body which has an attachment feature for receiving another component.

As shown in FIGS. 2, 3, 4, and 15, the lens cap apparatus 30 includes an adapter assembly 40, which, by example, is formed of a first adapter ring 42 and a second adapter ring 44.

The first and second adapter rings 42 and 44 are formed of a suitable non-corrosive, optical complimentary material, such as metal, i.e., aluminum, with or without a protective coating, a plastic, fiberous composite, or other suitable materials.

As will be apparent hereafter, although the adapter assembly 40 is described of first and second separate, discrete adapter rings 42 and 44, the adapter assembly 40 may be formed of an integral one-piece body machined or otherwise formed or molded into the shape described hereafter created by the joined first and second discrete adapter rings 42 and 44.

The adapter assembly 40 can also be formed by machining or molding in two separate components other than the first and second adapter rings 42 and 44. Further, the threads described hereafter on the first and second adapter rings 42 and 44 may be formed as an integral part of the first and second adapter rings 42 and 44 or as a separate metallic threaded element which is mounted in or on the first and second adapter rings 42 and 44 by a snap-in, press-in, adhesive or other connection. The threaded element can also be insert molded in either of the first and second adapter rings 42 and 44.

The first adapter ring 42 has an outer diameter sized to fixedly fit within the inner diameter of a first end portion 46 of the second adapter ring 44. The fixed engagement of the first adapter ring 42 in the second adapter ring 44 may be by a forced press or interference fit engageable threads 43 and 45 on both mating surfaces of the first and second adapter rings 42 and 44, an adhesive connection, a snap connection, or any other removable or non-removable attachment method.

The first adapter ring 42 has an inner surface 48 which tapers radially inward from a larger diameter first or outer end 50 to a smaller diameter or second, inner end 52.

The second adapter ring 44 has a solid constant diameter body 55 extending from a first end 56 to a reduced diameter second end 58. External threads 60 are provided on the second end 58 for threading engagement and disengagement with the threads 34 on the camera lens 32 as shown in FIG. 2.

Figure 3:
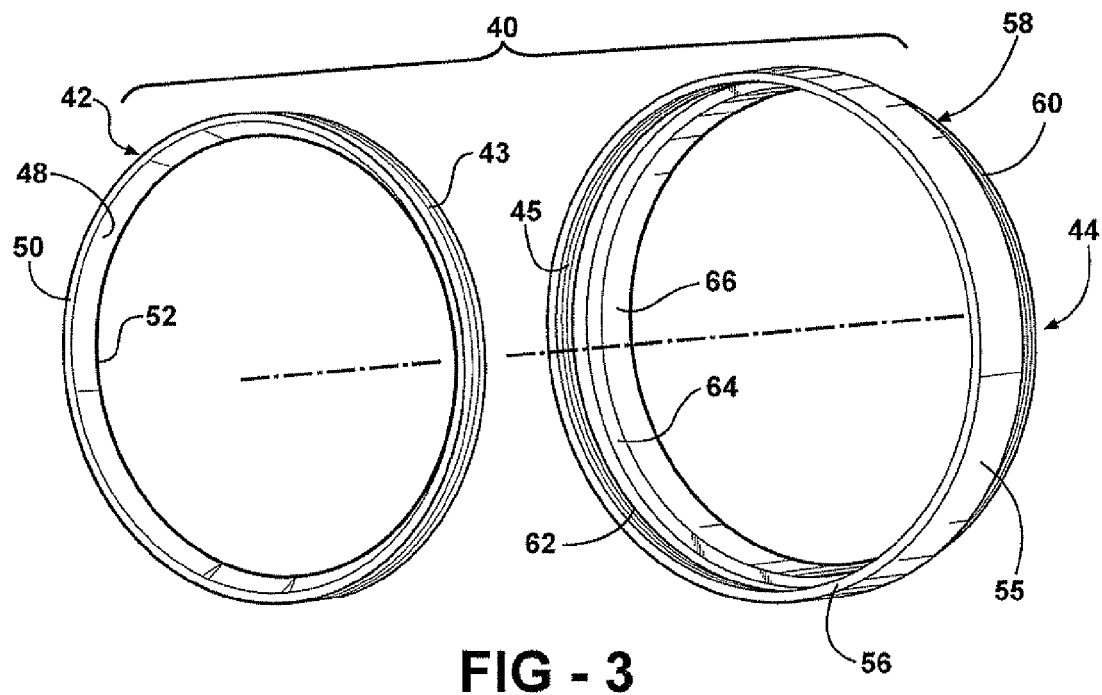
FIG. 3 is an exploded, front perspective view of the camera lens cap apparatus adapter first and second rings.
Figure 4:
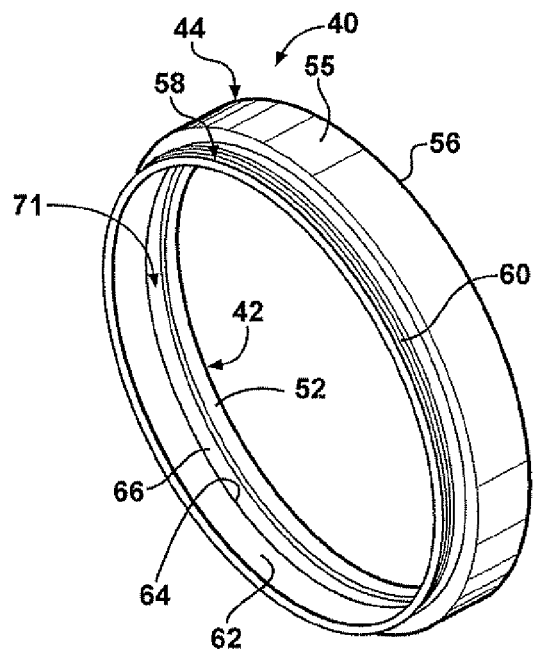
FIG. 4 is a rear perspective view of the assembled camera lens cap adapter.

As shown in FIGS. 3 and 4, the second adapter ring 44 has a constant, larger diameter inner surface 62 extending from the first end 56 to a shoulder or wall 64 which transitions to a smaller diameter inner surface 66 which extends to the second end 58.

The inner surface 66 in combination with the adjacent shoulders or wall 64 and the end 52 define a U-shaped groove 71 which extends into the adapter 40 from an open inner end.

A flange 65 is spaced from the wall 64 to function as an insertion limit for the mounting of the first adapter ring 42 to the second adapter ring 44.

Referring now to FIGS. 5-15, the lens cap apparatus 30 includes a cap 69 formed of a one-piece body of a machined metal, or a machined or molded plastic, fiber, composite, or other suitable material. The cap 69 has an endwall 70 and an annular sidewall 72 extending from the periphery of one edge of the endwall 70. As shown by example only in FIGS. 2 and 6, annular rings or ridges 72 may be formed on the outer surface of the endwall 70 for an optional decorative effect.

Figure 6:
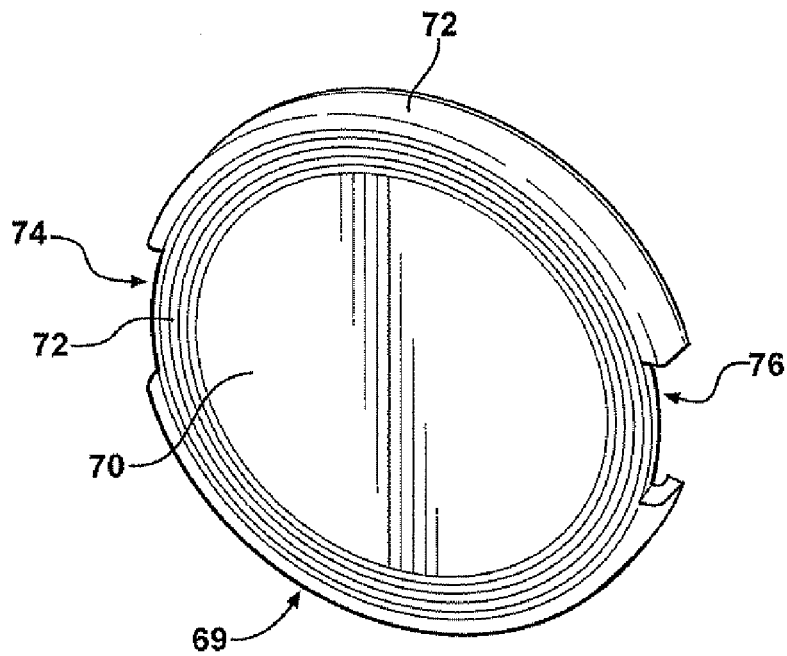
FIG. 6 is a front perspective view of the lens cap shown in FIG. 5.

A pair of generally diametrically opposed apertures 74 and 76, depicted by example only as arcuate slots, are formed in the sidewall 72 and an end portion of the endwall 70 as shown in detail in FIG. 6.

Figure 5:
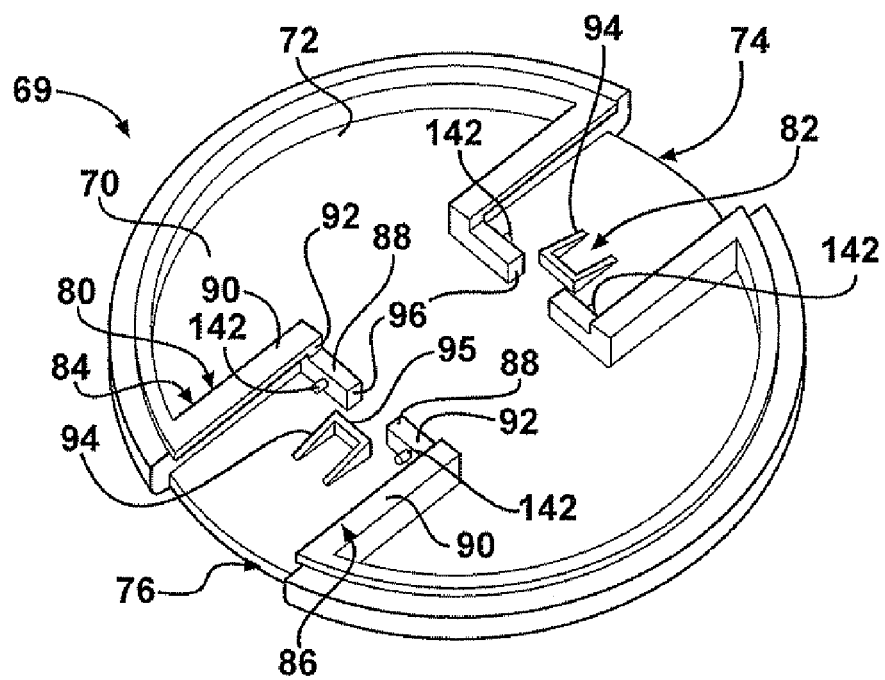
FIG. 5 is a rear perspective view of the lens cap, without the latch members.
Figure 7:
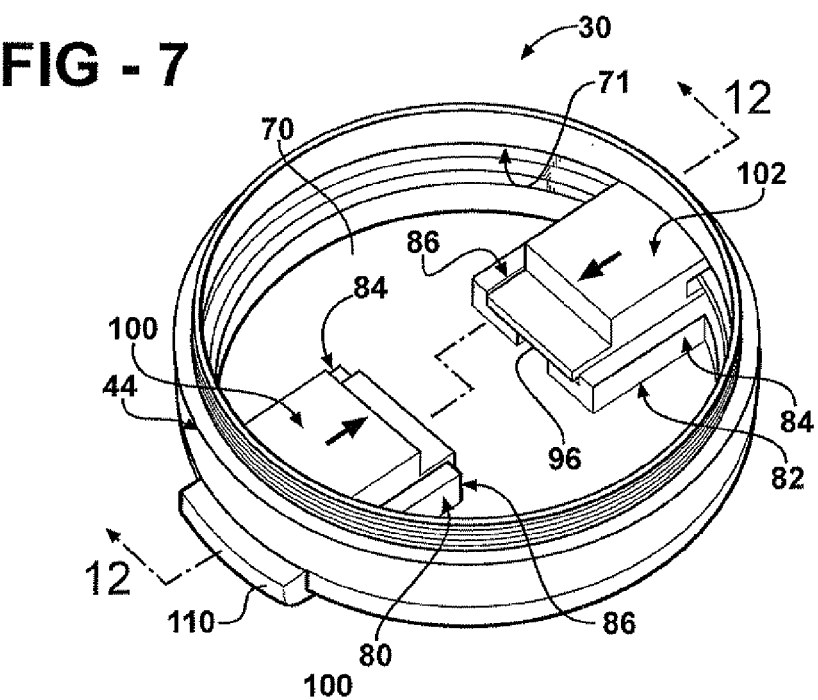
FIG. 7 is a rear perspective view of the lens cap, with the latch members, mounted on the adapter.

Referring now to FIGS. 5 and 7, a pair of latch receivers or latch mounting structures, 80 and 82, which may be substantially identical, are disposed on the inner surface of the endwall 70. Each latch mounting structure 80 and 82 includes a pair of generally L-shaped ribs 84 and 86 which extend inward from an inner surface of the sidewall 72. An inner, reduced height end portion 88 is formed on an inner end of each rib 84 and 86. The difference in height between the first portion 90 of each rib 84 and 86 and the reduced height end portion 88 creates a notch 92 between the first legs 90 and the second legs 88.

A wedge-shaped catch 94 is formed on the inner surface of the endwall 70 within each of the ribs 84 and 86 adjacent an opening 96 formed between spaced inner ends 96 of the ends 88 of each rib 84 and 86.

Substantially identical latch members, 100 and 102, are radially movably mounted within each latch mounting structure 80 and 82, respectively. As the latch members 100 and 102 are identical, only latch member 100 will be described hereafter in conjunction with FIGS. 7-15.

The latch member 100 can be formed of a one-piece body of a metal or plastic or other suitable material which is machined, molded or otherwise formed into a unitary body having a finger engagement portion 106 formed of a base 108 and an upstanding edge flange 110. Open-sided cutouts 112 are formed in the base 108 and extend along the outer surface of the base 108 opposed from an end 114 of the base 108 opposed from the flange 110.

Figure 8:
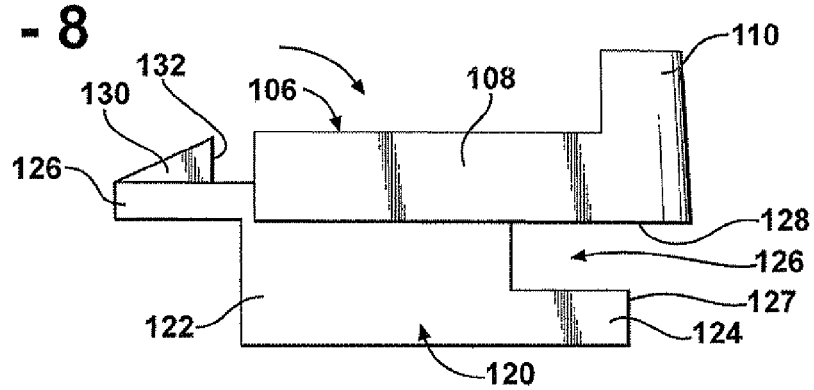
FIG. 8 is a side elevational view of one latch member.
Figure 9:
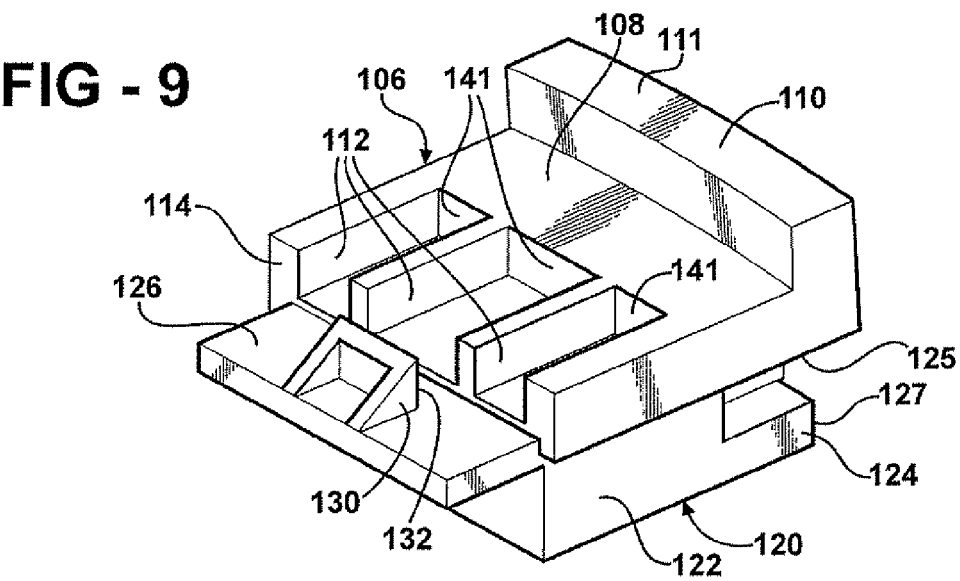
FIG. 9 is a left end, top, perspective view of the latch member shown in FIG. 8.

The latch member 100 also includes an adapter assembly engagement portion 120 having a central portion 122 integrally formed with and juxtaposed to the base 108 of the finger engagement end portion 106. First and second flanges 124 and 126 extend from diagonally opposite ends of the central portion 122. The first flange 124 is spaced from a surface of the base 108 to form a slot 128 as shown in FIGS. 8 and 9.

The flange 126 is disposed within the ribs 80 and 82 and over the ends 88.

A wedged-shaped catch 130 is carried on the second flange 126 and has an engagement surface 132 opposed from a similar engagement surface 95 on the catch 94 in the latch mounting structures 80 and 82. The catches 94 and 130 are aligned, as shown in FIG. 13, and limit the amount of radially outward travel of the latch members 100 and 102 by engagement of the catches 94 and 130 and retain the latch members 100 and 102 on the lens cap 69 when the lens cap 69 is not engaged with the adapter assembly 40.

Figure 12:
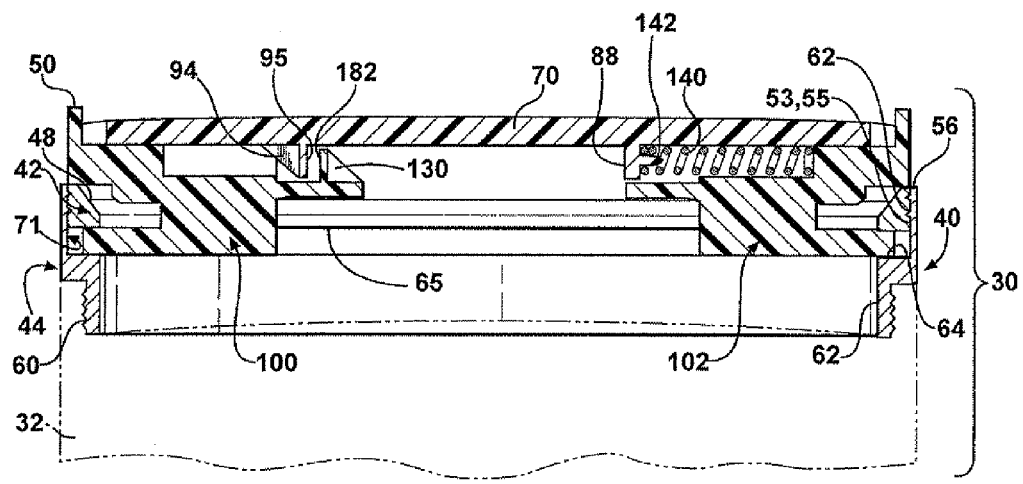
FIG. 12 is an inverted cross-sectional view of the lens cap apparatus generally taken along line 12-12 in FIG. 7, with the latch members shown in their radially outward biased, latching position in the adapter.
Figure 13:
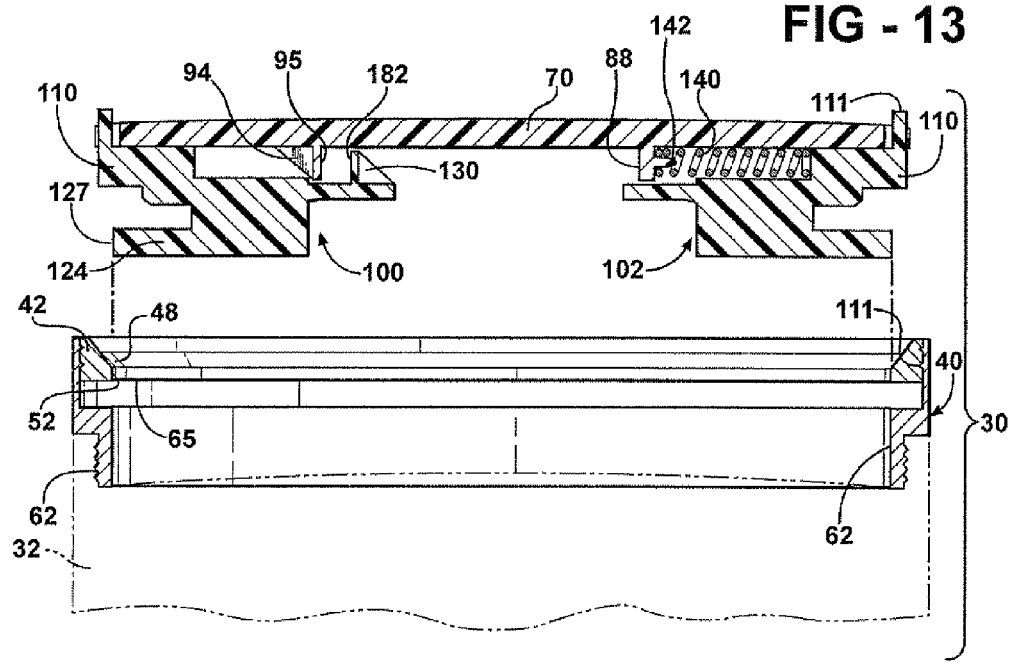
FIG. 13 is an inverted cross-sectional view similar to FIG. 12, but showing the latch members into an inward position allowing the lens cap to be mounted on or removed from the adapter.
Figure 14:
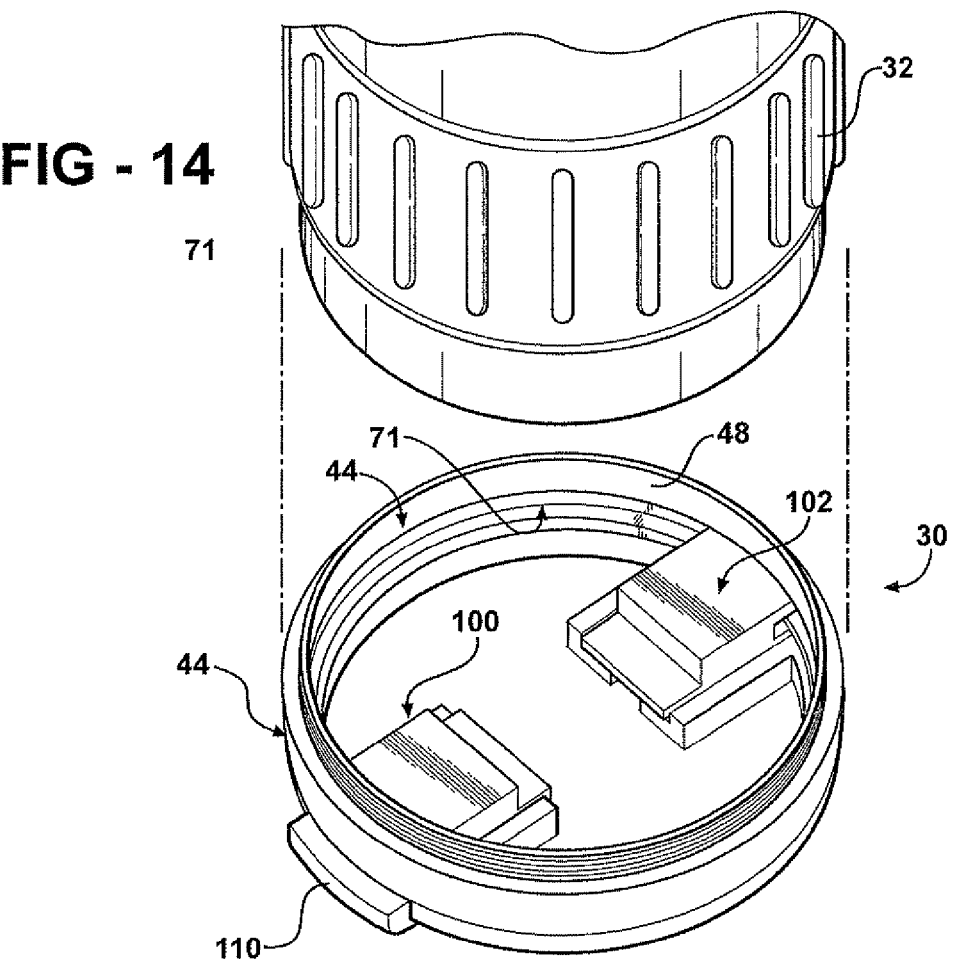
FIG. 14 is an exploded rear perspective view showing the lens cap prior to mounting on the adapter.
Figure 15:
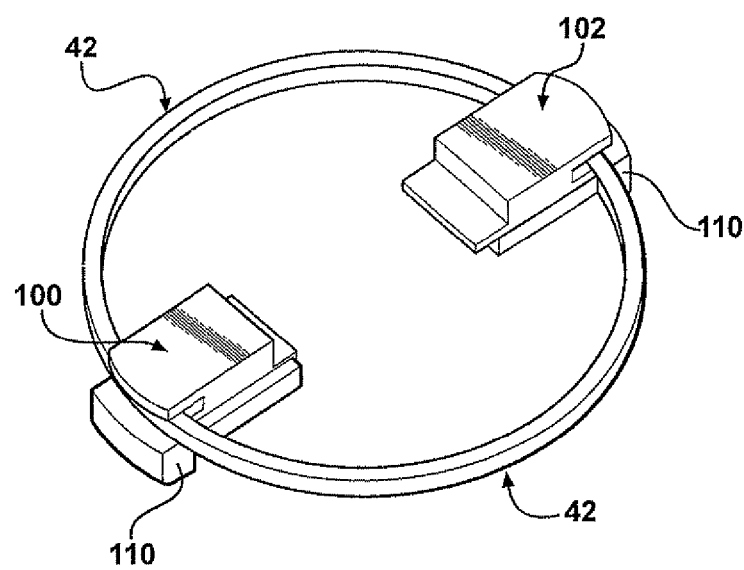
FIG. 15 is a perspective view showing only the latch members and one of the adapter rings.

A pair of biasing springs 140 shown in FIGS. 11-13 are disposed of each latch mounting structure 80 and 82 within the ribs 84 and 86, with one end of each spring 140 mounted over a spring post 142 formed in the second leg or end 88 of each rib 84 and 86. The opposite end of each spring 140 bears against an inner wall 141 of the open-ended cutout 112 of the latch members 110 and 102.

With the latch members 100 and 102 disposed in the orientation relative to the lens cap 69 shown in FIG. 11, the figure engagement surface or flange 110 is inserted through the inner diameter of the lens cap 69 through and into one of the apertures 74 or 76 in the lens cap 69, with an outer end 111 of each flange 110 projecting outward beyond the outer end surface of the endwall 70 of the cap. The outward end 111 also extends longitudinally along the sidewall 72. The latch members 100 and 102 are between ribs 84 and 86 and the legs 88.

As shown in FIG. 12, the springs 140 are compressed and captured between the second legs 88 of the ribs 84 and 86 and the inner wall 141 of the cutouts 112 in the latch members 100 and 102. This biases the flanges 110 radially outward from the outer periphery of the sidewall 72 to a first position hereinafter defined as the latched position. In this position, as also shown in FIG. 12, the flange 124 on the latch member 100 and 102 is engaged within the groove 70 formed in the adapter assembly 40 between the first and second adapter rings 42 and 44, as described above, to mount the lens cap 30 to the adapter assembly 40 in a position covering the optical surface 33 of the lens 32.

Radially inward finger pressure on the flanges 110 of both latch members 100 and 102 overcomes the radially outward biasing force of the springs 140 and allows each of the latch members 110 and 112 to move radially inward to what is hereafter defined as the second unlatched position shown in FIG. 13. When the latch members 100 and 102 are in the second unlatched position, the radially outer edge 127 of each flange 124 clears the radially inward-most surface 52 of the first adapter ring 42 so as to enable the entire lens cap 30 to be disengaged from the adapter ring assembly 40 and separated from the camera lens 32.

The lens cap 69 is also mountable on the adapter assembly 40 when the latch members 100 and 102 are moved to the second unlatched position shown in FIG. 13. Alternately, the lens cap 69 can be coupled to the adapter assembly 40 when the latch members 100 and 102 are in the first latched position due to the inward angled surface 48 on the first adapter ring 42 which forces the latch members 100 and 102 radially inward until the edges 127 clear the inner end of the first ring 42, allowing the lens cap 30 to continue to be inserted into the adapter assembly 40 until the flanges 124 move outwardly into the groove 71 latching the lens cap 69 to the adapter assembly 40.

Since the latch members 110 and 112 forceably engage the enlarged interior groove 71 formed in the adapter assembly 40, the lens cap 69 can be securely mounted on the adapter assembly 40 threadingly mounted on the lens 32 or an adapter ring or a filter mounted on the end of the lens 32 in a secure manner which minimizes the possibility of inadvertent disengagement of the lens cap 69 from the lens 32 when an external force is exerted on the lens cap 69. The latch members in prior lens caps engaged only the small height thread in the end of the adapter ring or lens which did not provide a sufficient surface to resist inadvertent disengagement of the lens cap from the lens when the latch members are forced over the small height thread in the lens by an external force.

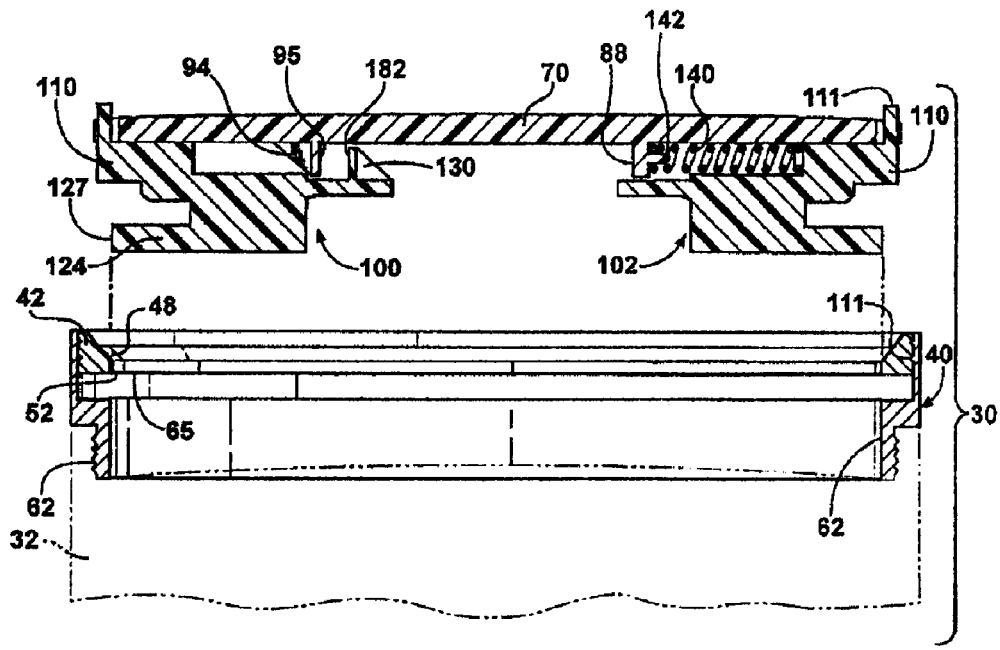

What is claimed is:

1. A lens cap apparatus removably mounted on a camera lens having an attachment end, the lens cap apparatus comprising:
    a lens cap adapter ring having first and second ends, the second end of the adapter ring adaptable for engagement with an attachment end of a camera lens;
    an annular groove carried intermediate the first and second ends of the adapter ring, the annular groove completely encircling an inner surface of the adapter ring in a circumferentially entending plane;
    a lens cap having an endwall; and
    a pair of latch members movably carried on the lens cap for movement between a first radially outward, latching position and a second radially inward unlatching position, each latch member having a user engageable surface and a spaced latch finger removably engageable with the annular groove in the adapter ring when the latch members are in the first latching position to mount the lens cap on the adapter ring.

2. The lens cap apparatus of claim 1 further comprising:
    latch mounting structures carried on the lens cap for movably receiving the latch members.

3. The lens cap apparatus of claim 2 wherein:
    the latch members are slidably mounted in each latch mounting structure.

4. The lens cap apparatus of claim 2 further comprising:
    biasing members mounted between each latch member and each latch mounting structure for normally biasing each latch member to the first latching position relative to the endwall of the lens cap.

5. The lens cap apparatus of claim 1 wherein each latch member comprises:
    a body having the user engageable surface and an adapter engageable surface.

6. The lens cap apparatus of claim 5 further comprising:
    opposed apertures formed in the lens cap, the user engageable surface of each latch member slidably disposed through one of the apertures.

7. The lens cap apparatus of claim 1 wherein the lens cap adapter ring comprises:
    a first adapter ring having an inner surface and an outer surface, the inner surface terminating in an annular shoulder; and
    a second adapter ring having an outer surface carrying the camera lens attachment feature and an inner surface including a shoulder;
    the first adapter ring fixedly mounted in the second adapter ring with the shoulders spaced from each other to form the annular groove.

8. The lens cap apparatus of claim 7 further comprising:
    a wall extending between the shoulders, the wall having a larger diameter than a radially inner diameter of the first and second adapter rings.

9. The lens cap apparatus of claim 7 wherein:
    the first and second adapter ring portions are discrete members.

10. The lens cap apparatus of claim 7 wherein:
    the inner surface of the first adapter ring is an angularly inward surface of decreasing diameter extending from the first end of the first adapter ring toward the shoulder.

11. The lens cap apparatus of claim 1 wherein the adapter comprises:
    an inner surface; and
    the groove extending radially inward from the inner surface.

12. The lens cap apparatus of claim 11 wherein:
    the groove is defined by opposed walls extending from an open inner end.

13. The lens cap apparatus of claim 11 wherein:
    the inner surface of the first adapter ring is an angularly inward surface of decreasing diameter extending from the first end of the first adapter ring toward the shoulder.

14. The lens cap apparatus of claim 1 wherein:
    the annular groove is a continuous circumferential groove.

* * * * *

UNITED STATES PATENT AND TRADEMARK OFFICE
CERTIFICATE OF CORRECTION

PATENT NO.         : 8,382,298 B2
APPLICATION NO.    : 11/866454
DATED              : February 26, 2013
INVENTOR(S)        : Gauger It is certified that error appears in the above-identified patent and that said Letters Patent is hereby corrected as shown below:

On title page, delete Item (12) "Guager" and insert Item (12) -- Gauger --.

Delete Item (76) Inventor and insert Item (76) -- Derek Gauger, San Diego, CA (US) -- as shown on the attached title page.

Signed and Sealed this
Ninth Day of April, 2013

Teresa Stanek Rea
*Acting Director of the United States Patent and Trademark Office*

(12) United States Patent
Gauger

(10) Patent No.: US 8,382,298 B2
(45) Date of Patent: Feb. 26, 2013

(54) CAMERA LENS CAP

(76) Inventor: Derek Gauger, San Diego, CA (US)

(*) Notice: Subject to any disclaimer, the term of this patent is extended or adjusted under 35 U.S.C. 154(b) by 775 days.

(21) Appl. No.: 11/866,454

(22) Filed: Oct. 3, 2007

(65) Prior Publication Data

US 2009/0091827 A1    Apr. 9, 2009

(51) Int. Cl.
*G02B 11/04* (2006.01)
(52) U.S. Cl. .................................................. 359/511
(58) Field of Classification Search .............. 359/511
See application file for complete search history.

(56) References Cited

U.S. PATENT DOCUMENTS

| 6,033,130 A | 3/2000 | Muroi et al. |
| 6,132,110 A | 10/2000 | Kume et al. |
| 6,672,777 B2 | 1/2004 | Kobayashi et al. |

FOREIGN PATENT DOCUMENTS

| JP | 602277236 | 11/1985 |
| JP | 04128729 | 4/1992 |
| JP | 200384332 | 3/2003 |
| JP | 2005114874 | 4/2005 |

OTHER PUBLICATIONS

International Search Report dated Feb. 26, 2009.*
Written Opinion of the International Searching Authority dated Feb. 26, 2009.*

* cited by examiner

*Primary Examiner* — Jennifer L. Doak
(74) *Attorney, Agent, or Firm* — Young, Basile, Hanlon & MacFarlane P.C.

(57) ABSTRACT

A camera lens cap includes radially movable latch members carried on an endwall of the cap and apparatus having exposed user engageable surfaces. The latch members are movable between the first latching position and a second unlatched position relative to an adapter which has a camera lens attachment feature. An interior groove formed in the adapter and engageable by the latch members when the latch members are disposed in the first latching position to affix the lens cap on the adapter and the camera lens.

14 Claims, 7 Drawing Sheets